US010142258B2

(12) United States Patent
Sadowski et al.

(10) Patent No.: US 10,142,258 B2
(45) Date of Patent: Nov. 27, 2018

(54) METHODS AND APPARATUS FOR PROCESSING IN A NETWORK ON CHIP (NOC)

(71) Applicant: Advanced Micro Devices, Inc., Sunnyvale, CA (US)

(72) Inventors: Greg Sadowski, Boxborough, MA (US); Edward McLellan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 253 days.

(21) Appl. No.: 15/093,983

(22) Filed: Apr. 8, 2016

(65) Prior Publication Data
US 2017/0295111 A1    Oct. 12, 2017

(51) Int. Cl.
| G06F 15/16 | (2006.01) |
| H04L 12/911 | (2013.01) |
| H04L 12/933 | (2013.01) |
| H04L 29/06 | (2006.01) |

(52) U.S. Cl.
CPC .......... *H04L 47/822* (2013.01); *H04L 49/109* (2013.01); *H04L 69/22* (2013.01)

(58) Field of Classification Search
CPC ...... H04L 47/822; H04L 49/109; H04L 69/22
USPC ....................................................... 709/226
See application file for complete search history.

(56) References Cited

U.S. PATENT DOCUMENTS

| 9,185,026 | B2 * | 11/2015 | Kumar | H04L 47/24 |
| 9,294,402 | B2 * | 3/2016 | Yamaguchi | H04L 49/109 |
| 9,306,844 | B2 * | 4/2016 | Locatelli | H04L 45/74 |
| 9,311,269 | B2 * | 4/2016 | Davis | G06F 15/177 |
| 9,479,456 | B2 * | 10/2016 | Hutton | H04L 49/109 |
| 9,507,599 | B2 * | 11/2016 | Muff | G06F 9/3012 |
| 9,548,945 | B2 * | 1/2017 | Tran | H04L 49/254 |
| 9,582,251 | B2 * | 2/2017 | Pudiyapura | G06F 8/33 |
| 9,652,239 | B2 * | 5/2017 | Muff | G06F 9/30145 |
| 9,652,425 | B2 * | 5/2017 | Chen | H04L 49/109 |
| 9,674,114 | B2 * | 6/2017 | Park | G06F 15/17381 |
| 9,699,096 | B2 * | 7/2017 | Satpathy | H04L 47/2458 |
| 9,729,439 | B2 * | 8/2017 | MeLampy | H04L 45/38 |
| 9,762,485 | B2 * | 9/2017 | Kaplan | H04L 45/74 |
| 9,787,571 | B2 * | 10/2017 | De | H04L 45/121 |
| 9,858,242 | B2 * | 1/2018 | Palmer | G06F 15/7825 |
| 9,860,197 | B2 * | 1/2018 | Kumar | H04L 49/9005 |
| 9,864,728 | B2 * | 1/2018 | Norige | H04L 49/109 |
| 9,866,476 | B2 * | 1/2018 | Anders | H04L 45/72 |
| 9,870,204 | B2 * | 1/2018 | Pudiyapura | G06F 8/33 |
| 2016/0028633 | A1 * | 1/2016 | Durand | H04L 43/0882 370/236 |
| 2017/0048166 | A1 * | 2/2017 | Kodi | H04L 49/109 |
| 2017/0063609 | A1 * | 3/2017 | Philip | H04L 41/0803 |
| 2017/0063625 | A1 * | 3/2017 | Philip | H04L 41/0889 |
| 2017/0063626 | A1 * | 3/2017 | Norige | H04L 41/0893 |
| 2017/0099236 | A1 * | 4/2017 | Ancajas | H04L 49/109 |
| 2017/0118139 | A1 * | 4/2017 | Bandic | G06F 3/0604 |

(Continued)

*Primary Examiner* — Melvin H Pollack
(74) *Attorney, Agent, or Firm* — Faegre Baker Daniels LLP

(57) ABSTRACT

Methods and apparatus of delegating instructions or data from a CU to an NOC node in a network on chip (NOC) is disclosed. The NOC node executes the delegated instructions or processes the delegated data. An NOC controller (NCC), which is operatively coupled to the CU and the NOC node, facilitates delegating the instructions or data from the CU to the NOC node.

20 Claims, 10 Drawing Sheets

(56) References Cited

U.S. PATENT DOCUMENTS

2017/0147528 A1* 5/2017 Sun ..................... G06F 15/7825
2017/0230253 A1* 8/2017 Chopra ................. H04L 41/145
2017/0272381 A1* 9/2017 Li ........................ H04L 49/109

* cited by examiner

METHODS AND APPARATUS FOR PROCESSING IN A NETWORK ON CHIP (NOC)

FIELD OF THE DISCLOSURE

The disclosure relates generally to processing in a network on chip (NOC), and more particularly, delegated processing in the NOC.

BACKGROUND

Multiprocessor system on chip (MPSOC) and chip multiprocessor (CMP) infrastructures use bus structures for on-chip communication. However, traditional bus-based communication schemes lack scalability and predictability, and are not capable of keeping up with increasing demands of future system on chips (SOCs). To meet the challenges of next-generation system designs, an NOC infrastructure, which is structured and scalable, has been proposed.

A conventional NOC infrastructure consists of multiple interconnects, each comprising a compute unit (CU), a homogeneous node, and a network interface (NI). The NI at the homogeneous node transforms data packet(s) from its original format generated from the CU into NOC fixed-length flow-control digits (flits) suitable for transmission in the NOC. The NOC flits associated with a data packet(s) consist of a header (or head) flit, a tail flit, and a number of body flits in between. The NOC flits are routed from a source node of one interconnect towards a target node of another interconnect, in a hop-by-hop manner. For example, when a source CU sends a data packet(s) to a target CU the source CU first sends the data packet(s) to the NI associated with the source CU which transforms the data packet(s) into NOC flits. The NOC flits are transferred to a source node associated with the source CU, which subsequently routes the NOC flits to a target node of another interconnect associated with the target CU. The NOC flits travel in a hop-by-hop manner via links, which couple all the homogeneous nodes together within the NOC, from the source homogeneous node to any intervening homogeneous nodes between the source and target homogeneous nodes, until the NOC flits reach the target node. Upon receiving the NOC flits, the target node converts the NOC flits to the data packet(s) of the original format generated from the source CU, and the converted data packet(s) are sent to the target CU.

When at least one CU of the NOC is executing an application, the CU generates data packet(s) that include processed data as a result of executing the application. For example, if the CU is executing an image rendering application, the CU may generate data packet(s) that include a rendered image. When data packet(s) including such processed data flows within the NOC in the form of NOC flits, the NOC may experience heavy data traffic. One of ordinary skill in the art will recognize that the more hops the flits take to reach its intended destination, and the more CUs there are that generate additional data packet(s) for transfer, the NOC will experience even heavier data traffic and more power dissipation.

In a conventional 2-dimensional NOC infrastructure, a node has five input ports and five output ports corresponding to the north, south, east, and west directions, as well as its associated CU. Each port is coupled to another port on the neighboring node via a set of physical interconnect wires or channels. The node's function is to route NOC flits received from each input port to an appropriate output port and then toward a target node. To realize this function, the node is equipped with an input buffer for each input port, a crossbar switch to direct NOC flit traffic to the desired output port, and necessary control logic to route the NOC flits. The node may include a plurality of input queues to receive NOC flits from neighboring nodes. The node may also include a local input queue to receive NOC flits from its associated CU. An arbiter and router serve as control logic to route the NOC flits from any of the aforementioned queues to the target node. For each NOC flit, the corresponding head flit specifies its intended target node, and after examining the head flit, the arbiter and router determine which output direction to route all the subsequent (body and tail) flits associated with the NOC flit according to routing algorithms as known in the art. Specifically, the arbiter and router communicates with a crossbar switch, which directs NOC flit traffic to the desired output port for transmission of NOC flits to other nodes of the NOC. If the node is coupled to a memory segment, the NOC flits may further be written into the memory segment.

All nodes in the conventional NOC are homogeneous in terms of having the same components within the nodes. In contrast, the CUs in the conventional NOC are heterogeneous in terms of having different processors within the CUs. For instance, a CU of one interconnect may have one type of processor, and another CU of another interconnect may have a different type of processor.

As mentioned above, one of ordinary skill in the art will recognize that the more hops the flits take to reach its intended destination, and the more CUs there are that generate additional data packet(s) for transfer, the NOC will experience heavy data traffic due to the processed data flow, and thus will cause more power dissipation. To address the power associated with heavy traffic, current solutions include low voltage signaling and data compression. Particularly, if an application is executed across a plurality of CUs, any CU that is not needed to run the application can individually be turned on or off with low voltage signaling, thereby saving power of the overall NOC. In addition, nodes themselves may have fixed functions such as encryption to further encrypt the processed data originating from CUs. For example, nodes may be able to further compress the processed data originating from CUs to reduce the processed data flow experienced by the NOC. However, as the NOC grows in complexity due to the number of CUs increasing, there will still be substantial power dissipation associated with data movement. What is needed is an improved mechanism to increase performance of data movement and to reduce power dissipation associated with data movement.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
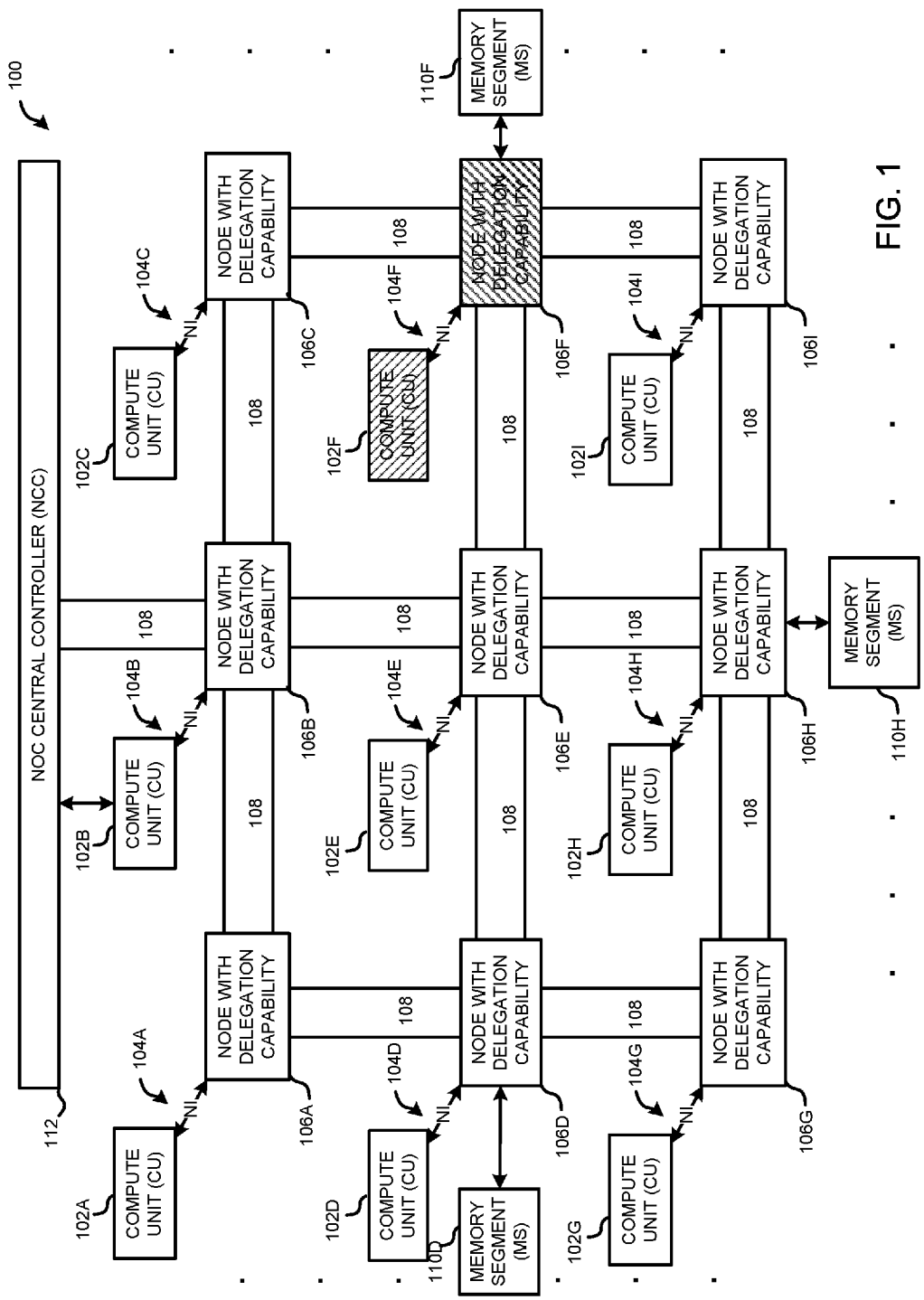
FIG. 1 is a block diagram illustrating an example of an integrated circuit having an NOC infrastructure employing a plurality of NOC nodes with delegation capability in accordance with one embodiment of the invention.

Briefly, in one example, an apparatus of delegating instructions from a CU to an NOC node in an NOC for execution of the instructions by the NOC node is disclosed. An NOC controller (NCC), which is operatively coupled to the CU and the NOC node, facilitates delegating the instructions from the CU to the NOC node. More particularly, the apparatus may be an integrated circuit that includes the NOC, and the NOC may further include a plurality of CUs, a plurality of NOC nodes interconnected to the plurality of CUs, and the NCC operatively coupled to the plurality of CUs and to the plurality of NOC nodes.

Each CU includes a processor having an instruction set. Each processor may identify instructions suitable for delegation by identification data embedded in the instructions. The plurality of NOC nodes are also operative to route data among the plurality of CUs, and each includes a processor having the same instruction set as the plurality of CUs. The NCC is operative to identify one of the plurality of NOC nodes as an NOC node designated for delegation of execution of instructions from at least one of the plurality of CUs. The NCC may issue an instruction delegation grant command to at least one of the CUs in response to an instruction delegation request from one of the CUs. The NCC further includes at least one request queue that receives the instruction delegation request from one of the CUs, and arbitration logic that retrieves the instruction delegation request from the at least one request queue to grant or deny the instruction delegation request based on at least one of the size of the at least one request queue and congestion reporting from the NOC nodes. The instruction delegation grant command includes node destination information that identifies at least one of the plurality of NOC nodes as an NOC node designated for delegation of execution of instructions from at least one of the plurality of CUs. The identification of the NOC node designated for delegation of execution of instructions may be based on a vicinity among the plurality of NOC nodes with respect to at least one memory segment.

The NOC may further include an instruction delegation unit that generates instruction delegation packet(s) to be sent to the designated NOC node based on the instruction delegation grant command. The instruction delegation packet(s) each includes a header that includes the node destination information that identifies the designated NOC node and a payload comprising delegated executable instructions. The at least one of the CUs is operative to send the instruction delegation packet(s) that include instructions delegated from the at least one of the CUs, to the designated NOC node, and specifically, to an instruction delegation function module. The instruction delegation function module, which may be a processor having the same instruction set as the at least one of the CUs, is operative to execute the instructions in the sent instruction delegation packet(s). Aside from executing instructions, the NOC nodes may also process data, and thus, each NOC node may include a delegation function module, such as a processor or fixed function hardware, that processes data. For instance, the delegation function module may be a floating point number function module, a video transcoding function module, a video encoding function module, a video decoding function module, a data compression function module, a data decompression function module to process data, or any other suitable module with specialized processing.

In another example, an apparatus of delegating data from a CU to an NOC node in an NOC for processing of the data by the NOC node is disclosed. An NCC, which is operatively coupled to the CU and the NOC node, facilitates delegating the data from the CU to the NOC node. More particularly, the apparatus may be an integrated circuit that includes the NOC, and the NOC may further include a plurality of heterogeneous CUs, a plurality of heterogeneous NOC nodes interconnected to the plurality of heterogeneous CUs, and an NCC operatively coupled to the plurality of heterogeneous CUs and to the plurality of heterogeneous NOC nodes.

The plurality of heterogeneous NOC nodes is operative to route data among the plurality of heterogeneous CUs. At least two of the plurality of heterogeneous NOC nodes have different types of function modules that perform delegatable functions delegated from at least one of the plurality of heterogeneous CUs. One of the plurality of heterogeneous CUs is operative to issue a node-level function request to the NCC indicating a type of function identified for use from at least one of the plurality of heterogeneous NOC nodes. The NCC is operative to identify at least one of the plurality of heterogeneous NOC nodes as an NOC node designated for the type of function identified by the at least one of the plurality of heterogeneous CUs, where the designated NOC node is operative to perform the type of function. The NCC may issue a node-level function module selection command to at least one of the plurality of heterogeneous CUs in response to the node-level function request. The NCC further includes at least one request queue that receives the node-level function request from one of the plurality of heterogeneous CUs, and arbitration logic that retrieves the node-level function request from the at least one request queue to grant or deny the node-level function request based on at least one of the size of the at least one request queue and congestion reporting from the plurality of heterogeneous NOC nodes. The node-level function module selection command includes node destination information that identifies at least one of the plurality of heterogeneous NOC nodes as an NOC node designated for the type of function identified by the at least one of the plurality of heterogeneous CUs in the node-level function request. The identification of the NOC node designated for the type of function may be based on a vicinity among the plurality of heterogeneous NOC nodes with respect to at least one memory segment.

The NOC may further include a function delegation unit that generates the function delegation packet(s) to be sent to the designated NOC node based on the node-level function module selection command. The function delegation packet(s) each includes a header that includes the node destination information that identifies the designated NOC node and a payload comprising data to be processed by the designated NOC node. The at least one of the plurality of heterogeneous CUs is operative to send function delegation packet(s) specific to the identified type of function to the designated NOC node. The designated NOC node is operative to process the sent function delegation packet(s) using any function module, such as a floating point number function module, a video transcoding function module, a video encoding function module, a video decoding function module, a data compression function module, a data decompression function module, or any suitable function module capable of performing the type of function identified by the at least one of the plurality of heterogeneous CUs.

In another example, a method of delegating instructions from a CU to an NOC node in an NOC for execution of the instructions by the NOC node is disclosed. An NCC, which is operatively coupled to the CU and the NOC node, facilitates delegating the instructions from the CU to the NOC node. More particularly, the method may include routing data among a plurality of CUs within the NOC and executing instructions delegated from at least one of the plurality of CUs. The method may further include identifying at least one of a plurality of NOC nodes within the NOC as an NOC node designated for delegation of execution of instructions from at least one of the plurality of CUs, where the designated NOC node is operative to execute the instructions. The method may further include issuing an instruction delegation grant command to at least one of the CUs in response to an instruction delegation request. The instruction delegation request may be received from one of the CUs, and may be granted or denied based on at least one of a size of at least one request queue and congestion reporting from the NOC nodes. The instruction delegation grant command may include node destination information that identifies at least one of a plurality of NOC nodes within the NOC as an NOC node designated for delegation of execution of instructions from at least one of the plurality of CUs. The method may further include identifying instructions suitable for delegation by identification data embedded in the instructions. The method may further include generating the instruction delegation packet(s) to be sent to the designated NOC node based on the instruction delegation grant command, the instruction delegation packet(s) each comprising a header that includes the node destination information that identifies the designated NOC node and a payload comprising delegated executable instructions. The method may further include sending instruction delegation packet(s) that include instructions delegated from the at least one of the CUs, to the designated NOC node. The method may further include executing the instructions in the sent instruction delegation packet(s).

In another example, a method of delegating data from a CU to an NOC node in an NOC for processing of the data by the NOC node is disclosed. An NCC, which is operatively coupled to the CU and the NOC node, facilitates delegating the data from the CU to the NOC node. More particularly, the method may include routing data among a plurality of heterogeneous CUs within the NOC and performing, by at least two of a plurality of heterogeneous NOC nodes, delegatable functions delegated from at least one of the plurality of heterogeneous CUs. At least two of the plurality of heterogeneous NOC nodes may have different types of function modules. The method may further include identifying at least one of the plurality of heterogeneous NOC nodes as an NOC node designated for the type of function identified by the at least one of the plurality of heterogeneous CUs. The designated NOC node is operative to perform the type of function. The method may further include issuing a node-level function request indicating a type of function identified for use from at least one of the plurality of heterogeneous NOC nodes. The node-level function request may be received from one of the plurality of heterogeneous CUs, and may be granted or denied based on at least one of a size of at least one request queue and congestion reporting from the plurality of heterogeneous NOC nodes. The method may further include issuing a node-level function module selection command to at least one of the plurality of heterogeneous CUs in response to the node-level function request. The node-level function module selection command may include node destination information that identifies at least one of the plurality of heterogeneous NOC nodes as an NOC node designated for the type of function identified by the at least one of the plurality of heterogeneous CUs in the node-level function request. The method may further include generating the function delegation packet(s) to be sent to the designated NOC node based on the node-level function module selection command, the function delegation packet(s) each comprising a header that includes the node destination information that identifies the designated NOC node and a payload comprising data to be processed by the designated NOC node. The method may further include sending function delegation packet(s) specific to the identified type of function to the designated NOC node. The method may further include processing the sent function delegation packet(s).

In another example, an apparatus including an integrated circuit that delegates instructions from a CU to an NOC node in an NOC for execution of the instructions by the NOC node is disclosed. An NCC, which is operatively coupled to the CU and the NOC node, facilitates delegating the instructions from the CU to the NOC node. More particularly, the apparatus may include memory storing an application, an input/output (I/O) port operatively coupled to the memory, an integrated circuit, operatively coupled to the memory and the I/O port, and a display operatively coupled to the integrated circuit. The integrated circuit may include an NOC, and the NOC may further include a plurality of CUs, a plurality of NOC nodes interconnected to the plurality of heterogeneous CUs, and an NCC operatively coupled to the plurality of CUs and to the plurality of NOC nodes.

The plurality of heterogeneous CUs includes at least a first CU and a second CU configured to execute the application. The first CU includes a CPU and a CPU instruction set and the second CU includes a GPU and a GPU instruction set. The plurality of NOC nodes are operative to route data among the plurality of heterogeneous CUs. The plurality of NOC nodes includes a first NOC node and a second NOC node, where the first NOC node includes a first processor having the same instruction set as the first CU and the second NOC node includes a second processor having the same instruction set as the second CU. The plurality of NOC nodes are operative to execute instructions delegated from at least one of the plurality of heterogeneous CUs. An NCC is operative to identify at least one of the plurality of NOC nodes as an NOC node designated for delegation of execution of instructions of the application from at least one of the plurality of CUs, where the designated NOC node is operative to execute the instructions. The NCC is further operative to issue an instruction delegation grant command to at least one of the CUs in response to an instruction delegation request. The instruction delegation grant command includes node destination information that identifies at least one of the plurality of NOC nodes as an NOC node designated for delegation of execution of instructions of the application from at least one of the plurality of CUs. The at least one of the CUs is operative to send instruction delegation packet(s) that include instructions delegated from the at least one of the CUs, to the designated NOC node. The designated NOC node is operative to execute the instructions of the application in the sent instruction delegation packet(s).

Referring now to FIG. 1, a block diagram illustrating an example of an integrated circuit having an NOC infrastructure employing a plurality of NOC nodes with delegation capability is shown. The NOC infrastructure 100 consists of multiple interconnects, each comprising a compute unit (CU), an NOC node with delegation capability, a network interface (NI), and an NOC controller (NCC) coupled to one of the interconnects. Although only nine interconnects are shown, and although the NCC is directly coupled to CU 102B, one of ordinary skill in the art will recognize that NOC infrastructure may have any number of interconnects, and the NCC may be directly coupled to any CU. The NOC infrastructure 100 is depicted as a two-dimensional structure for ease of illustration. However in some embodiments, the NOC infrastructure 100 may be three-dimensional.

Each NI transforms data packet(s) from its original format generated from the CU into NOC fixed-length flow-control digits (flits) suitable for transmission in the NOC. The NOC flits associated with data packet(s) consist of a header (or head) flit, a tail flit, and a number of body flits in between. The NOC flits are routed from a source NOC node of one interconnect towards a target NOC node of another interconnect, in a hop-by-hop manner. For example, when a source CU, such as CU 102B, sends data packet(s) to a target CU, such as CU 102F, the source CU first sends the data packet(s) to the NI associated with the source CU, such as NI 104B, which transforms the data packet(s) into NOC flits. The NOC flits are transferred to a source NOC node associated with the source CU, such as NOC node 106B, which subsequently routes the NOC flits to a target NOC node of another interconnect associated with the target CU, such as NOC node 106F. The NOC flits travel in a hop-by-hop manner via links, such as links 108, which couple all the NOC nodes together within the NOC, from the source NOC node to any intervening NOC nodes between the source and target NOC nodes, such as NOC node 106C, until the NOC flits reach the target NOC node. Upon receiving the NOC flits, the target NOC node converts the NOC flits to the data packet(s) of the original format generated from the source CU, and the converted data packet(s) is sent to the target CU.

In one embodiment, when at least one CU of the NOC is executing an application, the CU generates instruction delegation packet(s) that include delegation information as a result of executing the application. Delegation information may be in the form of an instruction for example. For instance, if the CU is executing an application, the CU may come across a particular instruction that is identified by an identifier, such as a pointer. Rather than executing the particular instruction, the CU may generate instruction delegation packet(s) that includes the particular instruction to be delegated for execution by its associated NOC node. By eliminating executed instructions from transferring between the source CU and the source NOC node, as well as between the source NOC node and the target NOC node, and allowing an instruction to transfer between the source CU and the source NOC node, as well as between the source NOC node and the target NOC node, one of ordinary skill in the art will recognize that data traffic can be reduced, and that the NOC will experience less power dissipation. Once the instruction reaches the target NOC node, the target NOC node may execute the instruction.

In another embodiment, when at least one CU of the NOC is a processor or a fixed hardware, the CU may generate data packet(s) that include delegation information for an NOC node to handle its processing. Here, delegation information includes the particular data to be delegated for processing by the NOC node. For example, if the CU is a processor equipped to handle basic arithmetic operations, such as an ALU, and floating point data needs to be processed, the CU may generate data packet(s) that includes the floating point data so that an NOC node with floating point capabilities, such as a floating point number function module, upon receipt of the data packet(s), can process the data packet(s) rather than by the CU. By eliminating processed data from transferring between the source CU and the source NOC node, as well as between the source NOC node and the target NOC node, and allowing data to transfer between the source CU and the source NOC node, as well as between the source NOC node and the target NOC node for processing at the target NOC node, one of ordinary skill in the art will recognize that data traffic can be reduced, and that the NOC will experience less power dissipation.

In both embodiments described above, the NCC, which is operatively coupled to both the CU and NOC node, facilitates communications between the CU and the NOC nodes. The NCC may include a mapping of each NOC node and each of its capabilities. For instance, the mapping may include which NOC nodes have an instruction delegation function module for executing delegatable instructions. The mapping may further include which NOC nodes have a particular delegation function module for processing delegatable data. The mapping may further include the location of all the CUs, NOC nodes, and memory segments of the NOC. Based on the mapping, the NCC is well-informed in facilitating the delegation efforts between the CU and the NOC nodes.

As can be seen from FIG. 1, the NOC nodes in the NOC are heterogeneous in terms of having different function modules within the NOC nodes. The CUs in the NOC are heterogeneous in terms of having different processors within the CUs.

Figure 2:
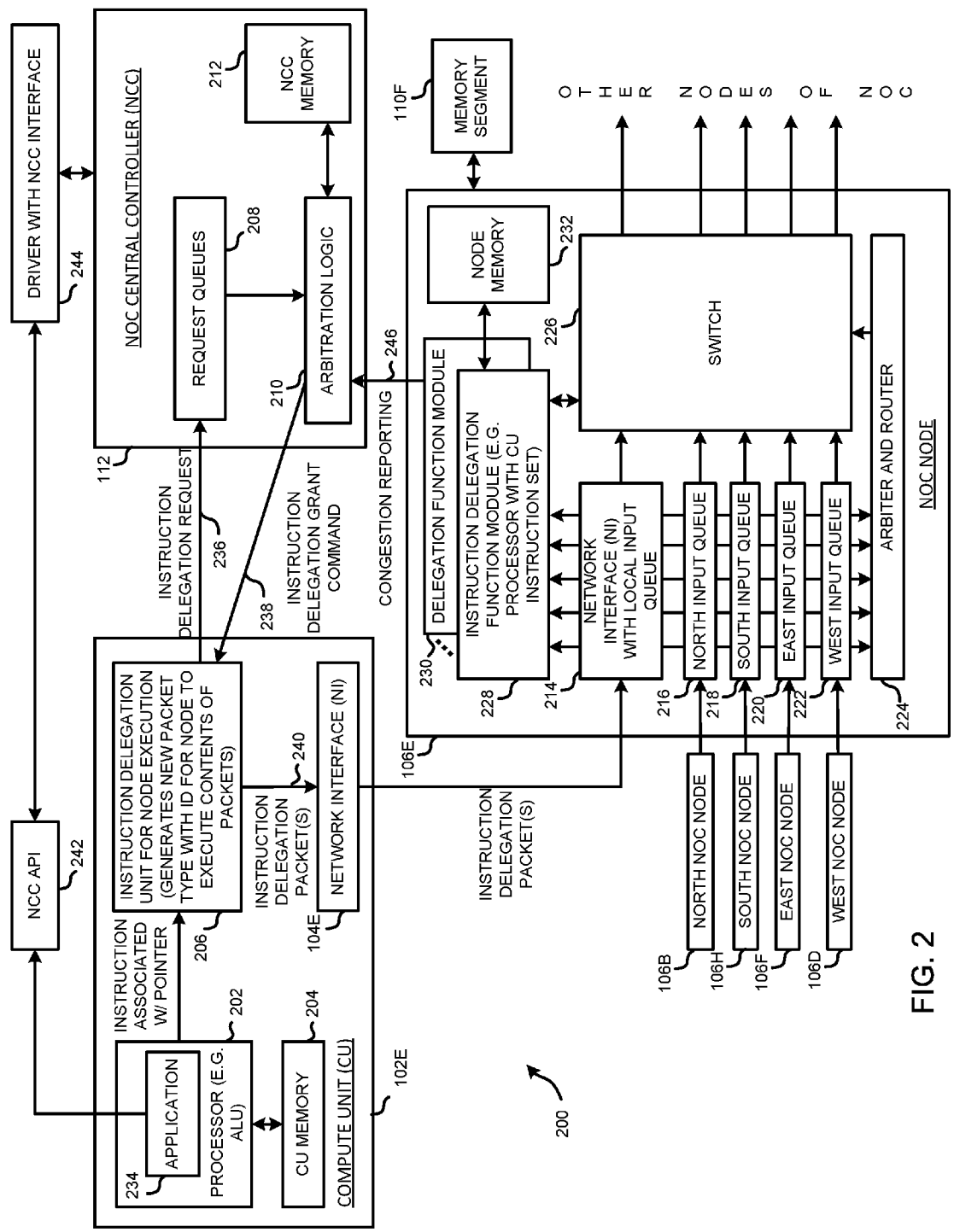
FIG. 2 is a block diagram illustrating an example of an interconnect of an NOC architecture employing an NOC node with delegation capability in accordance with one embodiment of the invention.

FIG. 2 is a block diagram illustrating an example of an interconnect of an NOC architecture employing an NOC node with delegation capability. For example, interconnect 200 includes CU 102E coupled to NOC node 106E by way of NI 104E at the CU 102E and NI with local input queue 214 at NOC node 106E. The NCC 112 may be operatively coupled to both the CU 102E and NOC node 106E. In this example, the NCC 112 serves as a central controller of the NOC. However, multiple controllers can be employed if desired. The CU 102E includes at least one processor 202, such as an ALU, a CPU, a GPU, distributed processing circuitry, an ASIC, a state machine, discrete logic, or any other suitable processing circuitry known in the art. The CU 102E may also include CU memory 204, which includes an application, or computer readable instructions, that CU 102E may execute. The NCC 112 includes request queues 208, arbitration logic 210, and NCC memory 212. The NCC memory 212 contains executable instructions that may be retrieved by the arbitration logic 210.

An application may utilize an NOC in a manner that allocates different NOC nodes within the NOC to different tasks needed to run the application. It is to be understood that the executable instructions of the application, which is typically generated by a compiler, includes various node-type executable instructions, such that the different NOC nodes within the NOC may execute the various node-type executable instructions. For example, if a particular NOC node includes an ARM® processor, then the executable instruction of the application may be of an ARM® processor-type that is compiled for use by the ARM® processor.

The processor 202 may retrieve application 234 from CU memory 204 for execution. Upon executing the application 234, application 234 acquires a set of credentials, or rights, from the NCC API 242 and NCC driver 244 in order to delegate instructions to the different NOC nodes, provided that the Quality of Service (QoS) level the application runs at meets a threshold level. The set of credentials may determine how many CUs are allowed to call to the NCC 112 during run-time of application 234, and may also indicate which NOC nodes can be requested for delegated computing. Upon acquiring the set of credentials from the NCC API 242 and NCC driver 244, application 234 loads a table of handles or pointers for the instructions that will be delegated, and subsequently executed, by the different NOC nodes, such that the table can be accessible by CU routines that move the instructions from CU memory 204 to the processor 202, and then to an NOC node that has been assigned for the execution of the instruction according to the table. After the set of credentials has been established, application 234 continues to run on the processor 202, until it reaches an instruction, indicated by a handle or pointer. In other words, the processor 202 may identify instructions suitable for delegation by identification data embedded in the instructions when executing the application 234.

Specifically, when processor 202 executes application 234 from CU memory 204 and reaches an identifier, such as a handle or pointer embedded in the instruction in which the instruction associated with the identifier is to be delegated for execution by NOC node 106E or another NOC node, the processor 202 sends the identified instruction to an instruction delegation unit 206, which in this example is a component of the CU 102E. Subsequently, the instruction delegation unit 206 sends an instruction request 236 to request queue(s) 208 at the NCC 112, where the NCC 112 either grants or denies the instruction request 236. Arbitration logic 210 at the NCC 112 accesses the request queue(s) 208 to retrieve the instruction delegation request 236 in order to grant or deny the instruction delegation request 236. Arbitration logic 210 at the NCC 112 may also take into account the size of the request queue(s) 208 and congestion reporting 246 from other NOC nodes of the NOC indicating traffic congestion when granting or denying the instruction delegation request 236, in addition to applying a conventional arbitration algorithm, such as a round robin, quality of service (QoS), and other suitable arbitration mechanisms. Arbitration logic 210 may include one or more specialized or general processors having one or multiple cores. The NCC memory 212 contains executable instructions that may be retrieved by the arbitration logic 210 for processing by its one or more processors.

Upon approval, arbitration logic 210 designates a particular NOC node of the NOC to execute the instruction. In order to notify the CU 102E of the designated NOC node, arbitration logic 210 sends an instruction delegation grant command 238, which includes node destination information of the designated NOC node, to the instruction delegation unit 206. The instruction delegation unit 206 generates executable type instruction delegation packet(s) 240 based on the received instruction delegation grant command 238 and the identified instruction from the processor 202, and sends the executable type instruction delegation packet(s) 240 to NI with local input queue 214, which transfers the executable type instruction delegation packet(s) 240 to the designated NOC node. Although the executable type instruction delegation packet(s) 240 are transformed by the NI with local input queue 214 into an NOC flit consisting of a header (or head) flit, a tail flit, and a number of body flits in between, the executable type instruction delegation packet(s) 240 will be representative of the NOC flit for ease of illustration. The executable type instruction delegation packet(s) 240 may include a header that includes the node destination information that identifies the designated NOC node and a payload comprising delegated executable instructions, such as the instruction associated with the identifier.

NOC node 106E has five input ports and five output ports corresponding to the north, south, east, and west directions as well as the associated CU 102E. Although five input ports and five output ports are shown, one of ordinary skill in the art will recognize that the embodiment is not limited to such a two-dimensional configuration, and as such, more or less input and output ports, as well as three-dimensional configurations, are further contemplated. Each port is coupled to another port on the neighboring NOC node via a set of physical interconnect wires (channels). NOC node 106E's function is to route instruction delegation packet(s) received from each input port to an appropriate output port and then toward a target NOC node. To realize this function, NOC node 106E is equipped with an input buffer for each input port, a crossbar switch to direct instruction delegation packet(s) traffic to the desired output port, and necessary control logic to route the instruction delegation packet(s). Specifically, NOC node 106E includes north input queue 216, south input queue 218, east input queue 220, and west input queue 222 to receive executable type instruction delegation packet(s) from north NOC node 106B, south NOC node 106H, east NOC node 106F, and west NOC node 106D, respectively. NOC node 106E also includes NI with local input queue 214 to receive executable type instruction delegation packet(s) from CU 102E. Arbiter and router 224 serves as control logic to route the executable type instruction delegation packet(s) from any of the aforementioned input queues to a target NOC node, but for ease of illustration, NOC node 106E is the target NOC node. One of ordinary skill in the art will recognize that the target NOC node may be any NOC node in the NOC as described in FIG. 1.

For each instruction delegation packet, because the header specifies its intended target NOC node, arbiter and router 224 may determine which output direction to route the executable type instruction delegation packet(s) based on the header and any routing algorithms known in the art. Arbiter and router 224 communicates with crossbar switch 226, which directs instruction delegation packet traffic to the desired output port for transmission of the executable type instruction delegation packet(s) to other NOC nodes of the NOC.

If NOC node 106E is the target NOC node, the arbiter and router 224 facilitates the routing of the executable type instruction delegation packet (e.g. the executable type instruction delegation packet(s) 240) from the input queue (e.g. local input queue 214) to an instruction delegation function module 228, such as a processor having the same instruction set as the source CU. For ease of illustration, NOC node 102E is the source CU, but one of ordinary skill in the art will understand that any of the CUs of FIG. 1 may be the source CU. The instruction set and other code necessary to execute the executable type instruction delegation packet may be stored in node memory 232 and loaded onto the instruction delegation function module 228. Subsequently, the instruction delegation function module 228 executes the instruction in the executable type instruction delegation packet(s) 240. The instruction delegation function module 228 may packetize the result of the execution and send the resulting packet to the crossbar switch 226, which may route the resulting packet to other NOC nodes of the NOC or a destination memory segment, such as memory segment 110F operatively coupled to the NOC node 106E.

By eliminating executed instructions from transferring between the CU 102E and the NOC node 106E, and allowing an executable instruction to transfer between the CU 102E and NOC node 106E for execution at NOC node 106E instead, one of ordinary skill in the art will recognize that data traffic can be reduced, and that the NOC will experience less power dissipation. Further data traffic can be reduced if the executable instruction hops through multiple NOC nodes within the NOC. Although the flow of instructions has been emphasized in FIG. 2, NOC node 106E is still capable of routing data provided by other NOC nodes.

Figure 3:
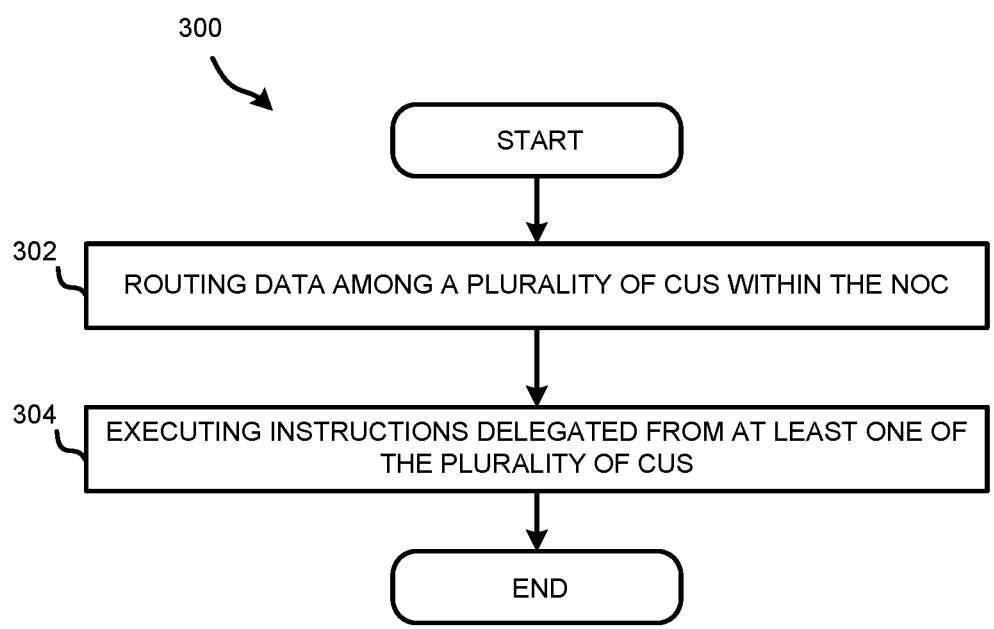
FIG. 3 is a flowchart generally illustrating an example of a method in an NOC of delegating execution of instructions in accordance with one embodiment of the invention.

FIG. 3 is a flowchart generally illustrating an example of a method in an NOC of delegating execution of instructions. Particularly, the method 300 illustrated in FIG. 3 may be performed by the interconnect 200 described in FIG. 2. As shown in block 302, the method includes routing data among a plurality of CUs within the NOC. For example, NOC node 102E may be capable of routing data among a plurality of CUs within the NOC. As shown in block 304, the method further includes executing instructions delegated from at least one of the plurality of CUs. The NCC 112 of FIG. 2, which may be operatively coupled to the CU and the NOC node, may facilitate delegating the instructions from the CU to the NOC node. The method may further include identifying, such as by the NCC 112, at least one of a plurality of NOC nodes within the NOC as an NOC node designated for delegation of execution of instructions from at least one of the plurality of CUs. The designated NOC node is operative to execute the instructions. The method may further include issuing an instruction delegation grant command to at least one of the CUs in response to an instruction delegation request, the instruction delegation grant command including node destination information that identifies at least one of a plurality of NOC nodes within the NOC as an NOC node designated for delegation of execution of instructions from at least one of the plurality of CUs. For example, NCC 112 of FIG. 2 may issue an instruction delegation grant command 238 to CU 102E in response to instruction delegation request 236. The instruction delegation grant command 238 may identify NOC node 106E for delegation of execution of instructions from the CU 102E. The method may further include sending instruction delegation packet(s) that include instructions delegated from the at least one of the CUs, to the designated NOC node. For example, CU 102E may send instruction delegation packet(s) 240 that include instructions delegated from CU 102E to NOC node 106E. The method may further include executing the instructions in the sent instruction delegation packet(s). For example, the NOC node 106E may execute the instructions in the sent instruction delegation packet(s) 240.

Figure 4:
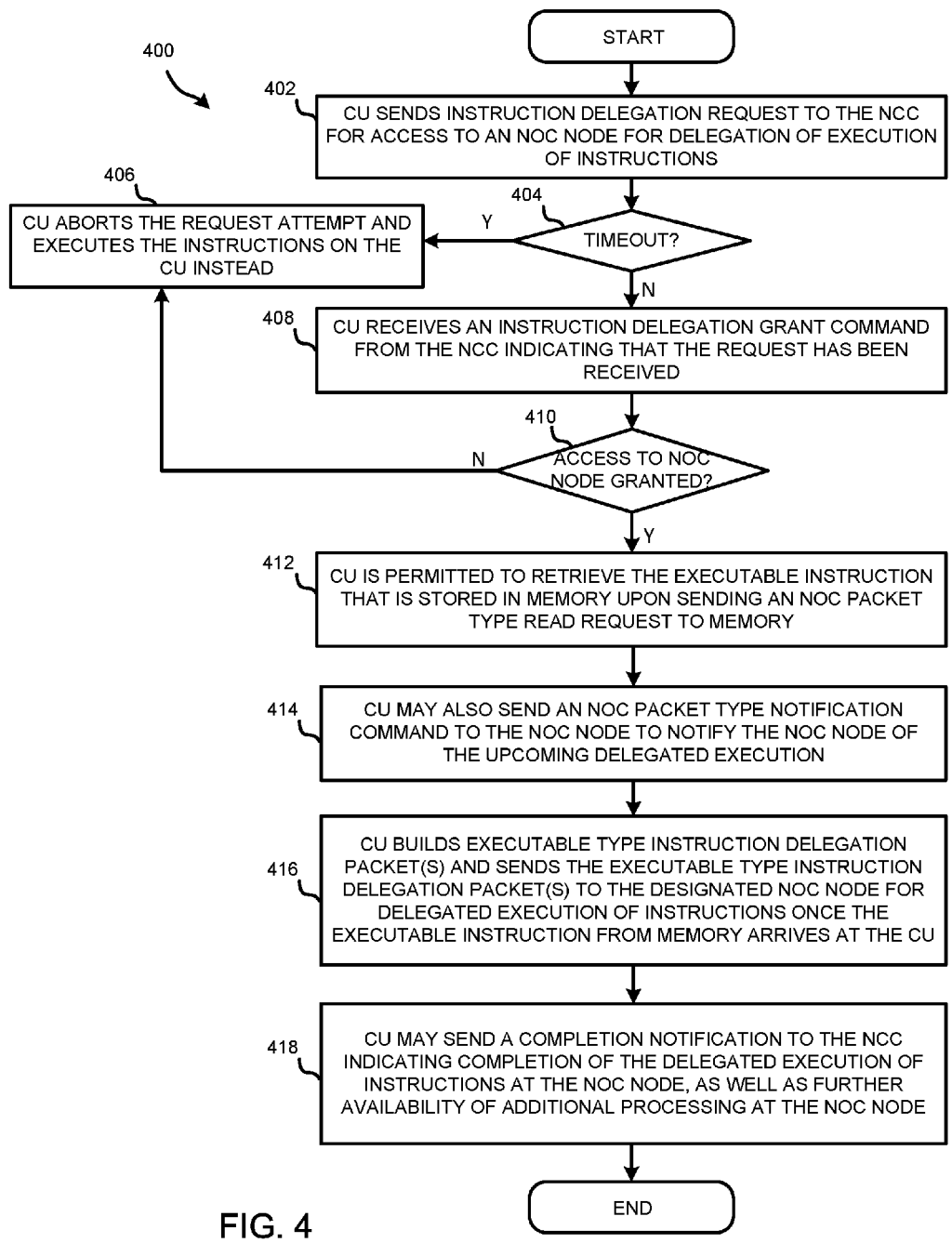
FIG. 4 is a flowchart generally illustrating another example of a method in an NOC of delegating execution of instructions in accordance with one embodiment of the invention.

FIG. 4 is a flowchart generally illustrating another example of a method in an NOC of delegating execution of instructions. Specifically, the method 400 describes communication between a CU and the NCC from the perspective of the CU. As shown in block 402, the method includes the CU sending an instruction delegation request to the NCC for access to an NOC node for delegation of execution of instructions. For example, CU 102E may send an instruction delegation request 236 to the NCC 112 for access to NOC node 106E for delegation of execution of instructions, as shown in FIG. 2. As shown in block 404, if there is a timeout in the instruction delegation request, the CU aborts the request attempt and executes the instructions on the CU instead, as indicated in block 406. If there is no timeout, the method proceeds to block 408, where the CU receives an instruction delegation grant command from the NCC indicating that the instruction delegation request has been received. Subsequently, if the NCC denies access to the NOC node at block 410, the method proceeds to block 406, where the CU aborts the request attempt and executes the instructions on the CU instead. If the NCC grants access to the NOC node at block 410, the CU is permitted to retrieve the executable instruction that is stored in memory upon sending an NOC packet type read request to memory, as shown in block 412. For example, CU 102E may retrieve the executable instruction that is stored in CU memory 204 upon sending an NOC packet type read request to CU memory 204. Next, as shown in block 414, the CU may send an NOC packet type notification command to the NOC node to notify the NOC node of the upcoming delegated execution task. The CU may then build executable type instruction delegation packet(s) and send the executable type instruction delegation packet(s) to the designated NOC node for delegated execution of instructions once the executable instruction from memory arrives at the CU, as shown in block 416. Finally, the CU may send a completion notification to the NCC indicating completion of the delegated execution of instructions at the NOC node, as well as further availability of additional processing at the NOC node.

Figure 5:
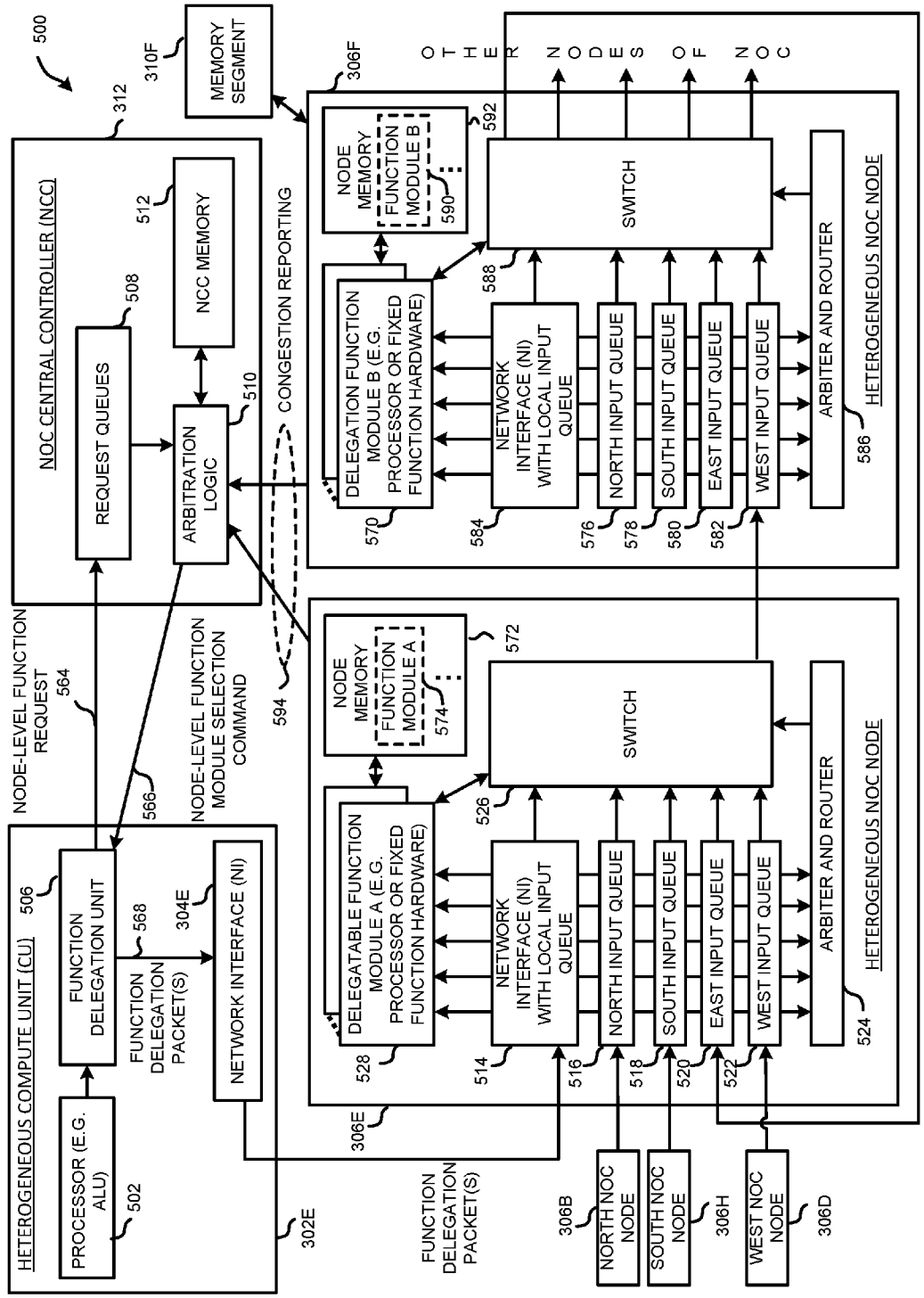
FIG. 5 is a block diagram illustrating another example of an interconnect of an NOC architecture employing an NOC node with delegation capability in accordance with one embodiment of the invention.

FIG. 5 is a block diagram illustrating another example of an interconnect of an NOC architecture employing an NOC node with delegation capability. For example, interconnect 600 includes CU 102E coupled to NOC node 106E by way of NI 104E at the CU 102E and NI with local input queue 514 at NOC node 106E. The NCC 112 may be operatively coupled to both the CU 102E and NOC node 106E. In this example, the NCC 112 serves as a central controller of the NOC. However, multiple NCCs can be employed if desired. The CU 102E includes at least one programmed processor 502 or a fixed hardware, such as an ALU, a CPU, a GPU, distributed processing circuitry, an ASICs, state machines, discrete logic, or any other suitable processing circuitry known in the art.

If, for example, the programmed processor 502 is equipped to handle basic arithmetic operations, such as an ALU, and floating point data needs to be processed, the programmed processor 502 may notify a function delegation unit 506 for it to generate data packet(s) that includes the floating point data so that an NOC node with floating point capabilities, upon receipt of the data packet(s), can process the data packet(s) rather than the programmed processor 502. This is in contrast to the processor 202 of FIG. 2 which is configured to send instructions for executing an application to the instruction delegation unit 206, as opposed to sending actual data (e.g. floating point data) for processing.

Subsequently, the function delegation unit 506 sends a node-level function request 564 to request queue(s) 508 at the NCC 112, where the NCC 112 either grants or denies the node-level function request 564. Arbitration logic 510 at the NCC 112 accesses the request queue(s) 508 to retrieve the node-level function request 564 in order to grant or deny the node-level function request 564. Arbitration logic 510 at the NCC 112 may take into account the size of the request queue(s) 508 and congestion reporting 594 from other NOC nodes of the NOC indicating traffic congestion when granting or denying the node-level function request 564, in addition to conventional arbitration algorithms, such as a round robin, quality of service (QoS), and other suitable arbitration mechanisms.

Upon approval, arbitration logic 510 designates a particular NOC node of the NOC to process the delegated data, such as the floating point data. In order to notify the CU 102E of the designated NOC node, arbitration logic 510 sends a node-level function module selection command 566, which includes node destination information of the designated NOC node, to the function delegation unit 506. The function delegation unit 506 generates function delegation packet(s) 568 based on the received node-level function module selection command 566 and the delegated data from the processor 502, and sends the function delegation packet(s) 568 to NI with local input queue 514, which transfers the function delegation packet(s) 568 to the designated NOC node. Although the function delegation packet(s) 568 is transformed by the NI with local input queue 514 into an NOC flit consisting of a header (or head) flit, a tail flit, and a number of body flits in between, for ease of illustration, function delegation packet(s) 568 will be representative of the NOC flit. The function delegation packet(s) 568 may each include a header that includes the node destination information that identifies the designated NOC node and a payload comprising the delegated data.

Similar to FIG. 2, NOC node 106E has five input ports and five output ports corresponding to the north, south, east, and west directions as well as the associated CU 102E. Although five input ports and five output ports are shown, one of ordinary skill in the art will recognize that the embodiment is not limited to such a two-dimensional configuration, and as such, more or less input and output ports, as well as three-dimensional configurations, are further contemplated. Each port is coupled to another port on the neighboring NOC node via a set of physical interconnect wires (channels). NOC node 106E's function is to route function delegation packet(s) received from each input port to an appropriate output port and then toward a target NOC node. To realize this function, NOC node 106E is equipped with an input buffer for each input port, a crossbar switch to direct function delegation packet(s) traffic to the desired output port, and necessary control logic to route the function delegation packet(s). Specifically, NOC node 106E includes north input queue 516, south input queue 518, east input queue 520, and west input queue 522 to receive function delegation packet(s) from north NOC node 106B, south NOC node 106H, east NOC node 106F, and west NOC node 106D, respectively. NOC node 106E also includes NI with local input queue 514 to receive function delegation packet(s) 568 from CU 102E. Arbiter and router 524 serves as control logic to route the function delegation packet(s) from any of the aforementioned input queues to a target NOC node, but for ease of illustration, NOC node 106E is the NOC target node. One of ordinary skill in the art will recognize that the target NOC node may be any NOC node in the NOC as described in FIG. 1.

For each function delegation packet, because the header specifies the intended target NOC node, arbiter and router 524 may determine which output direction to route function delegation packet(s) based on the header and any routing algorithms as known in the art. Arbiter and router 524 communicates with crossbar switch 526, which routes function delegation packet traffic to the desired output port for transmission of the function delegation packet(s) to other NOC nodes of the NOC.

If NOC node 106E is the target NOC node, arbiter and router 524 of the NOC node facilitates the routing of the function delegation packet (e.g. route function delegation packet(s) 568) from the input queue (e.g. local input queue 514) to a delegatable function module 528, such as a programmed processor or fixed function hardware. Subsequently, the delegatable function module 528 processes the delegated data in the function delegation packet(s) 568. The delegatable function module 528 may packetize the result of the processing and send the resulting packet to the crossbar switch 526, which may route the resulting packet to other NOC nodes of the NOC or memory segment, such as memory segment 110F operatively coupled to the NOC node 106E via NOC node 106F. The function code necessary to process the function delegation packet(s) 568, denoted as function module A 574, may be stored in node memory 572 and loaded onto the delegatable function module 528.

As can be seen from FIG. 5, the NOC nodes in the NOC are heterogeneous in terms of having different delegatable function modules within the NOC nodes. For example, delegatable function module A 528 of NOC node 106E may be a floating point number function module and delegation function module B 570 of NOC node 106F may be a different delegatable function module, such as a video transcoding function module. Other examples of delegatable function modules include a floating point number function module, a video transcoding function module, a video encoding function module, a video decoding function module, a data compression function module, and data decompression function module, or any other suitable function module. The remaining components of NOC node 106F may be the same components that make up an NOC node, such as north input queue 576, south input queue 578, east input queue 580, west input queue 582, NI with local input queue 584, arbiter and router 586, crossbar switch 588, and node memory 592. The function code necessary to process the function delegation packet(s) 568, denoted as function module B 590, may be stored in node memory 592 and loaded onto the delegatable function module B 570.

Further, another embodiment of NOC node 106E of FIG. 2 may have a delegation function module 230 in addition to the instruction delegation function module 228, where the delegation function module 230 may be a floating point number function module, a video transcoding function module, a video encoding function module, a video decoding function module, a data compression function module, and data decompression function module, or any other suitable function module. Thus, an NOC that features an NOC node having instruction delegation function module and a delegatable function module and another NOC node having only an instruction delegation function module can be considered to have heterogeneous NOC nodes.

By eliminating processed data from transferring between CU 102E and NOC node 106E, and allowing data to transfer between CU 102E and NOC node 106E for processing at NOC node 106E, one of ordinary skill in the art will recognize that data traffic can be reduced, and that the NOC will experience less power dissipation. Further data traffic can be reduced if the data hops through multiple NOC nodes within the NOC. Although the flow of instructions has been emphasized in FIG. 5, NOC node 106E is still capable of routing data provided by other NOC nodes.

Figure 6:
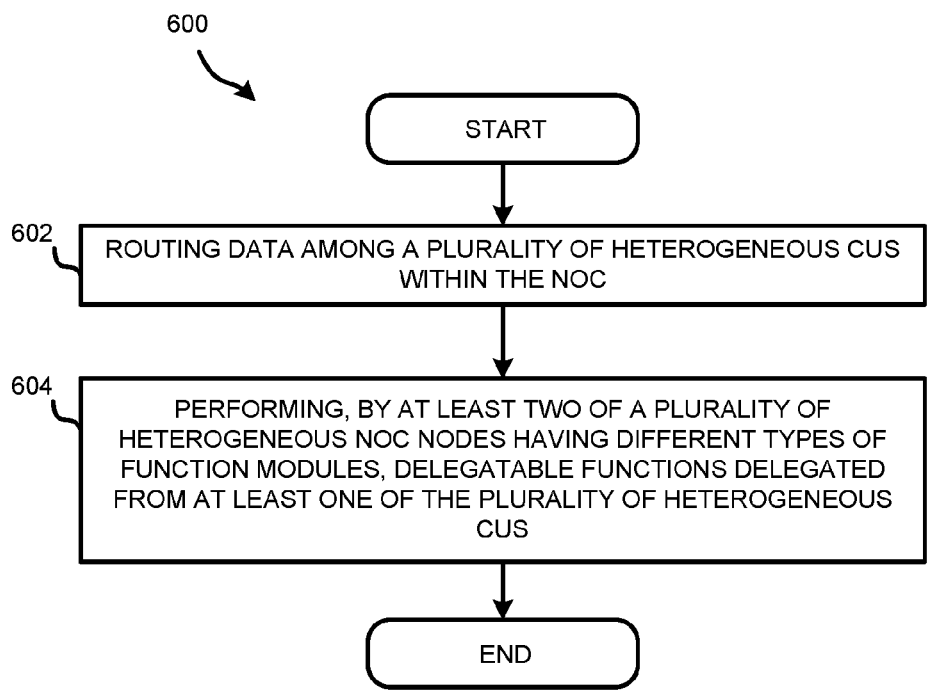
FIG. 6 is a flowchart generally illustrating an example of a method in an NOC of delegating data for processing in accordance with one embodiment of the invention.

FIG. 6 is a flowchart generally illustrating an example of a method in an NOC of delegating data for processing. Particularly, the method 600 illustrated in FIG. 6 may be performed by the interconnect 500 described in FIG. 5. As shown in block 602, the method includes routing data among a plurality of heterogeneous CUs within the NOC. For example, NOC node 102E may be capable of routing data among heterogeneous CUs 102E and 102F. As shown in block 604, the method includes performing, by at least two of a plurality of heterogeneous NOC nodes having different types of function modules, delegatable functions delegated from at least one of the plurality of heterogeneous CUs. For example, NOC node 106E, having a different type of function module than NOC node 106F as described in FIG. 5, may perform a particular function instead of a CU 102E performing the particular function. The method may further include identifying, such as by NCC 112 of FIG. 5, at least one of the plurality of heterogeneous NOC nodes as an NOC node designated for the type of function identified by the at least one of the plurality of heterogeneous CUs, where the designated NOC node is operative to perform the type of function. The method may further include issuing a node-level function request indicating a type of function identified for use from at least one of the plurality of heterogeneous NOC nodes. For example, the CU 102E of FIG. 5 may issue the node-level function request 364 indicating a type of function, such as a floating point number function, identified for use from NOC node 106E. The method may further include issuing a node-level function module selection command to at least one of the plurality of heterogeneous CUs in response to the node-level function request, the node-level function module selection command including node destination information that identifies at least one of the plurality of heterogeneous NOC nodes as an NOC node designated for the type of function identified by the at least one of the plurality of heterogeneous CUs in the node-level function request. For example, NCC 112 of FIG. 5 may issue the node-level function module selection command 566 to CU 102E in response to the node-level function request 564, the node-level function module selection command 566 including node destination information that identifies NOC node 106E as an NOC node designated for the type of function identified by CU 102E in the node-level function request 564. The method may further include sending function delegation packet(s) specific to the identified type of function to the designated NOC node. For example, the CU may send function delegation packet(s) 568 specific to the identified type of function to the NOC node 106E. The method may further include processing the sent function delegation packet(s). For example, the NOC node 106E may process the sent function delegation packet(s) 568.

Figure 7:
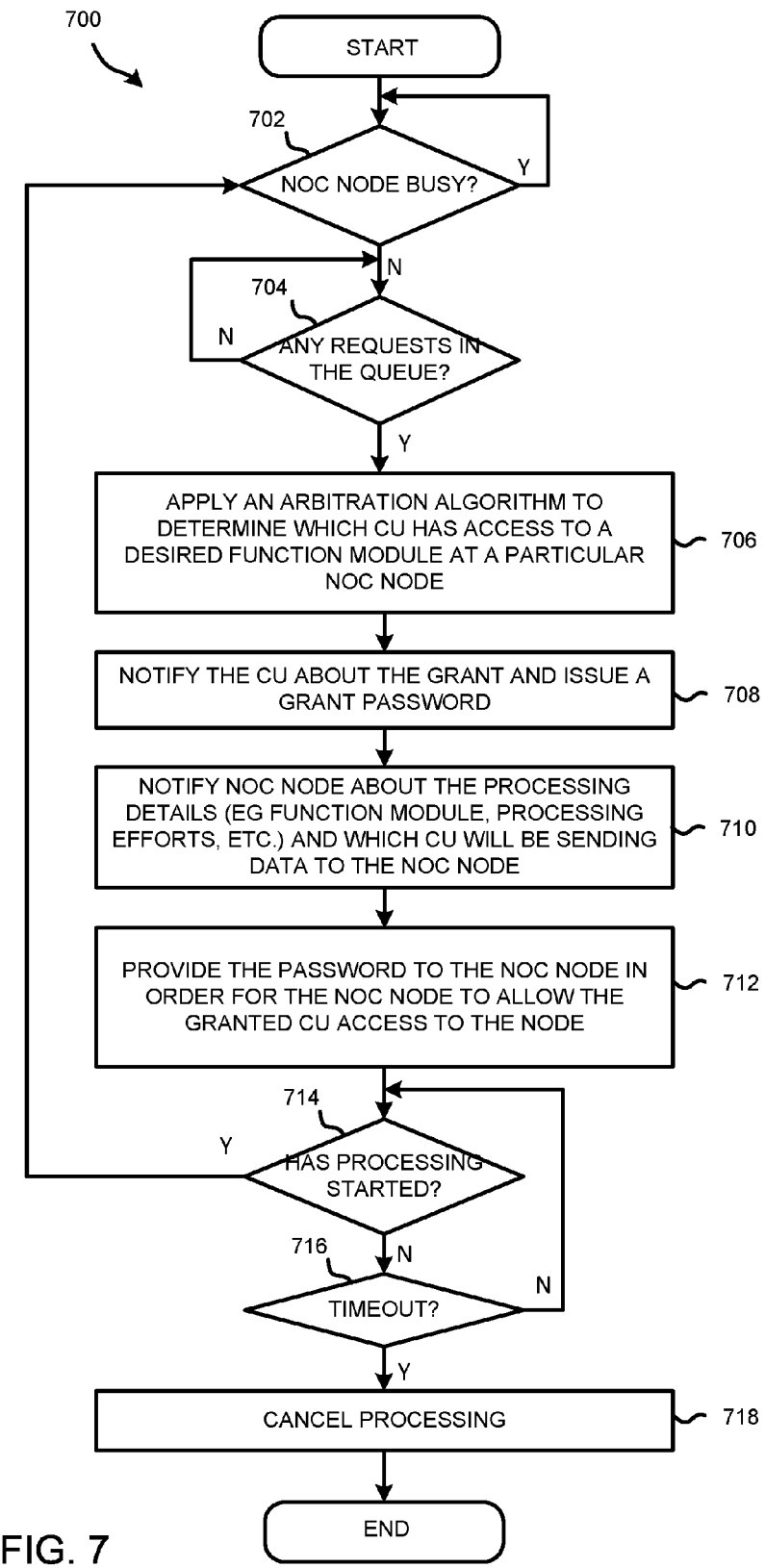
FIG. 7 is a flowchart generally illustrating another example of a method in an NOC of delegating data for processing in accordance with one embodiment of the invention.

FIG. 7 is a flowchart generally illustrating another example of a method in an NOC of delegating data for processing. Specifically, the method 700 describes granting a CU access to an NOC node from the perspective of the NCC. As shown in block 702, the NCC may monitor whether an NOC node is processing data. If the NOC node is not processing data and thus available, the NCC may monitor whether there are any requests from the CU in the request queue(s), as shown in block 704. If there are any requests (e.g. either instruction delegation request 236 in FIG. 2 or node-level function request 564 in FIG. 5) in the request queue(s), the NCC may apply an arbitration algorithm, such as a round robin, quality of service (QoS), and other suitable arbitration mechanisms, to determine which CU has access to a desired function module at a particular NOC node, as shown in block 706. The desired function module may be either an instruction delegation function module (e.g. instruction delegation function module 228 in FIG. 2) or a delegation function module (e.g. delegation function module 528 in FIG. 5). As shown in block 708, the NCC may notify the CU about the grant (via either an instruction delegation grant command 238 or node-level function module selection command 566) and issue a grant password to the CU so that the CU can access the NOC node. The NCC may subsequently notify the NOC node about the execution/processing details (such as the particular function module requested) and which CU will be sending instructions/data to the NOC node, as shown in block 710. As shown in block 712, the NCC may provide the same password to the NOC node in order for the NOC node to allow the granted CU access to the NOC node. If the execution of instructions or processing of data begins, as shown in block 714, the method may repeat at block 702. Otherwise, the NCC determines if there is a timeout, as shown in block 716. If there is no timeout, the method may repeat at block 714. If there is a timeout, execution of instructions or processing of data is cancelled, as shown in block 718.

Figure 8:
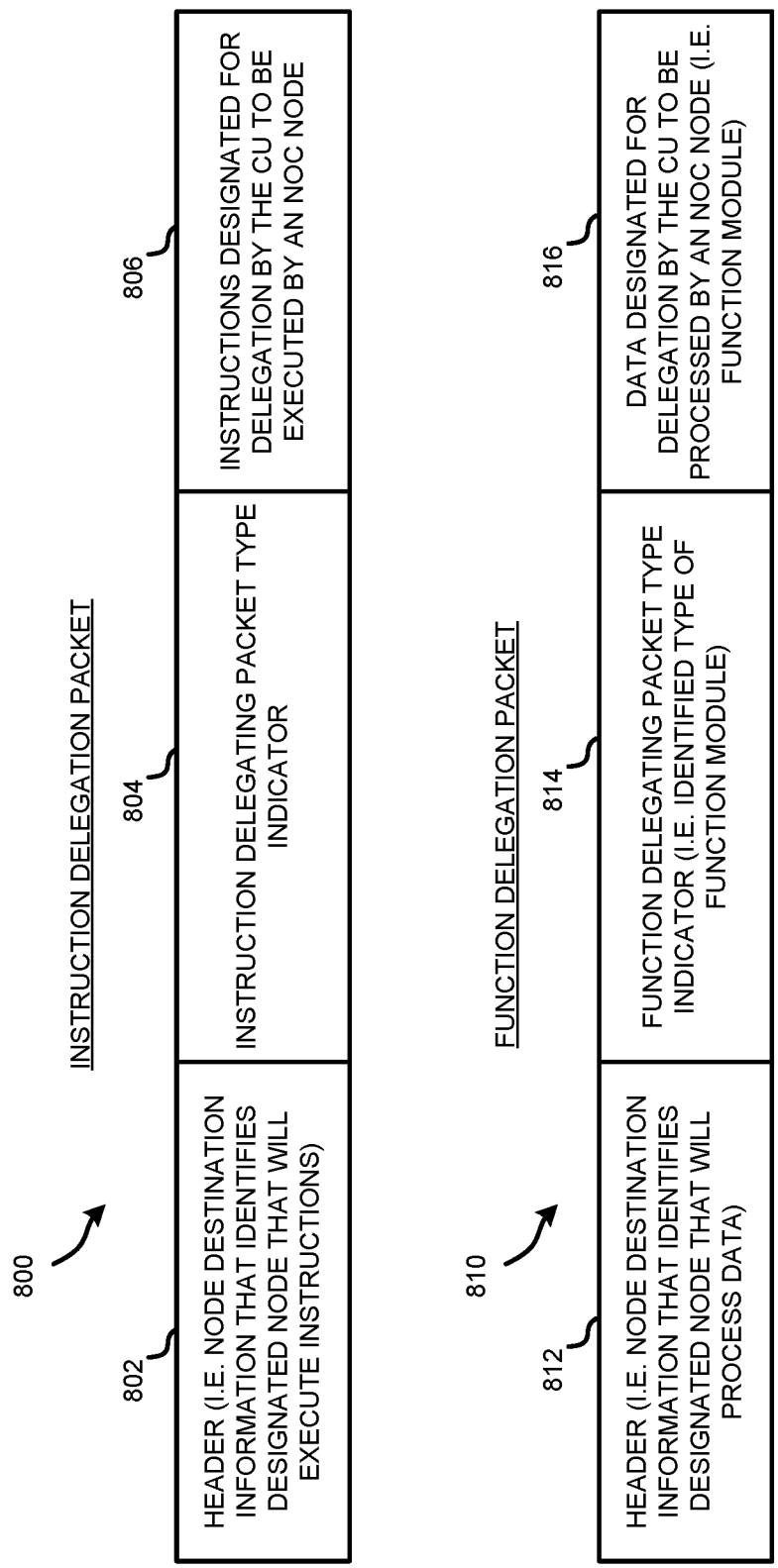
FIG. 8 illustrates an example of instruction delegation packet(s) and function delegation packet(s) in accordance with one embodiment of the invention.

FIG. 8 illustrates an example of an instruction delegation packet and a function delegation packet. Instruction delegation packet 800 includes a header 802, an optional instruction delegating packet type indicator 804, and the instructions 806 designated for delegation by the CU to be executed by an NOC node. The header 802 further includes node destination information that identifies the designated NOC node that will execute instructions. Function delegation packet 810 includes a header 812, an optional function delegating packet type indicator 814, and data 816 designated for delegation by the CU to be processed by an NOC node. The header 812 may further include node destination information that identifies the designated NOC node that will process data. The optional function delegating packet type indicator 814 may be an identified type of function module, such as a floating point number function module, a video transcoding function module, a video encoding function module, a video decoding function module, a data compression function module, a data decompression function module, or other suitable function module. The data 816 designated for delegation by the CU to be processed by an NOC node can be processed by the NOC node, such as floating point data.

Figure 9:
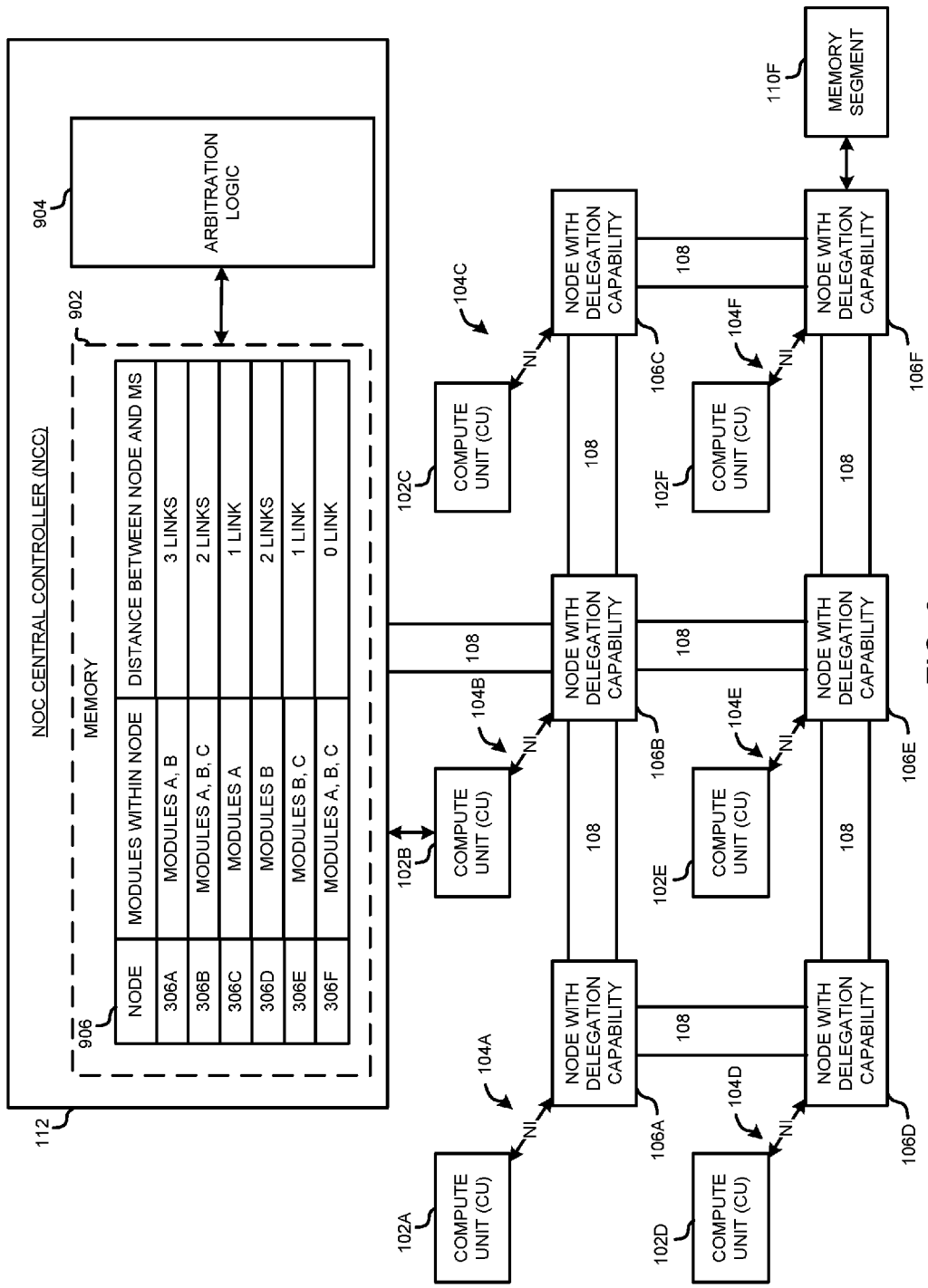
FIG. 9 is a block diagram illustrating another example of an integrated circuit having an NOC infrastructure employing a plurality of NOC nodes with delegation capability in accordance with one embodiment of the invention.

FIG. 9 is a block diagram illustrating another example of an integrated circuit having an NOC infrastructure employing a plurality of NOC nodes with delegation capability. Specifically, the NCC may be loaded with a mapping table to facilitate delegating instructions or data from any of the CUs to any of the NOC nodes. For example, mapping table 906 may specify which function modules exist within the nodes. As indicated in FIG. 9, mapping table 906, stored in NCC memory 902, shows that NOC node 106A includes function module A and function module B, which for illustration purposes, may be delegatable function module A 528 and delegatable function module B 570 of FIG. 5, respectively. Mapping table 906 also shows that NOC node 106F includes function module A and function module B, which for illustration purposes, may be and delegatable function module A 528 and delegatable function module B 570 of FIG. 5, respectively, and further includes function module C, which for illustration purposes, may be instruction delegation function module 228 of FIG. 2. If CU 102A requests for instruction delegation, NCC 112 may avoid providing access to NOC node 106A for execution of instructions by referencing the mapping table, because NOC node 106A does not have an instruction delegation function module. Instead, NCC 112 may provide access to NOC node 106F for execution of instructions because NOC node 106F has an instruction delegation function module. If CU 102A requests for data delegation for delegatable function module A, the NCC may decide whether to grant access to NOC node 106A or NOC node 106F for example, pursuant to arbitration logic discussed above because both NOC nodes have delegatable function module A.

Further, designating an NOC node for delegation of instructions or data may be pursuant to vicinity among the plurality of NOC nodes with respect to at least one memory segment. As described above, if CU 102A requests for data delegation for delegatable function module A, the NCC may decide whether to grant access to NOC node 106A or NOC node 106F because both NOC nodes have delegatable function module A. If a resulting packet following processing of data needs to be routed to memory segment 110F, NCC 112 may designate NOC node 106F instead of NOC node 106A because NOC node 106F is closer in vicinity to memory segment 110F based on mapping table 906, which shows that NOC node 106A is 3 links away from memory segment 110F, while NOC node 106F is 0 links away from memory segment 110F. Accordingly, with respect to FIG. 5, the node-level function module selection command 566 provided by NCC 112 may include node destination information that identifies at least one of the plurality of heterogeneous NOC nodes as an NOC node designated for the type of function identified by the at least one of the plurality of heterogeneous CUs based on a vicinity among the plurality of heterogeneous NOC nodes with respect to at least one memory segment. Similarly, if a resulting packet following execution of instructions needs to be routed to memory segment 110F, NCC 112 may designate NOC node 106E instead of NOC node 106B because NOC node 106E is closer in vicinity to memory segment 110F by one link based on mapping table 906. Accordingly, with respect to FIG. 2, the instruction delegation grant command 238 includes node destination information that identifies at least one of the plurality of NOC nodes as an NOC node designated for delegation of execution of instructions from the at least one of the plurality of CUs based on a vicinity among the plurality of NOC nodes with respect to at least one memory segment. This would reduce the number of links that the resulting packet would travel through, thereby reducing data movement and reducing power dissipation.

Alternatively, designating an NOC node for delegation of instructions or data may be pursuant to the size of the request queue at the NCC or congestion reporting from the NOC nodes. For instance, even if NOC node 106E is closer in vicinity to memory segment 110F by one link based on mapping table 906, NCC 112 may designate NOC node 106B to execute instruction delegation packet(s) or process function delegation packet(s) rather than NOC node 106E if the request queue at the NCC includes more instruction delegation packet(s) or process function delegation packet(s) that identify NOC node 106E as the destination NOC node in the respective headers as opposed to instruction delegation packet(s) or process function delegation packet(s) that identify NOC node 106B as the destination NOC node.

As another example, NOC node 106E may indicate that it is congested with receiving packet(s) from a source CU, such as CU 102B, by sending an explicit notification message to CU 102B, where the CU 102B may then forward the explicit notification message to NCC 112, or by sending a direct congestion message to NCC 112. Arbitration logic of NCC 112 may process either the explicit notification message or direct congestion message when determining whether to grant or deny an instruction delegation request 236 or node-level function request 564. Thus, even if NOC node 106E is closer in vicinity to memory segment 110F by one link based on mapping table 906, NCC 112 may designate NOC node 106B to execute instruction delegation packet(s) or process function delegation packet(s) rather than NOC node 106E if the congestion reporting (e.g. congesting reporting 246) from NOC node 106E indicates a certain level of congestion. The congestion level may be measured, for instance, by how long (e.g. minimum amount of time, maximum amount of time, an average of the minimum and maximum amount of time, etc.) a packet or a flit waits in the input queue (e.g. local input queue 214) of NOC node 106E.

Figure 10:
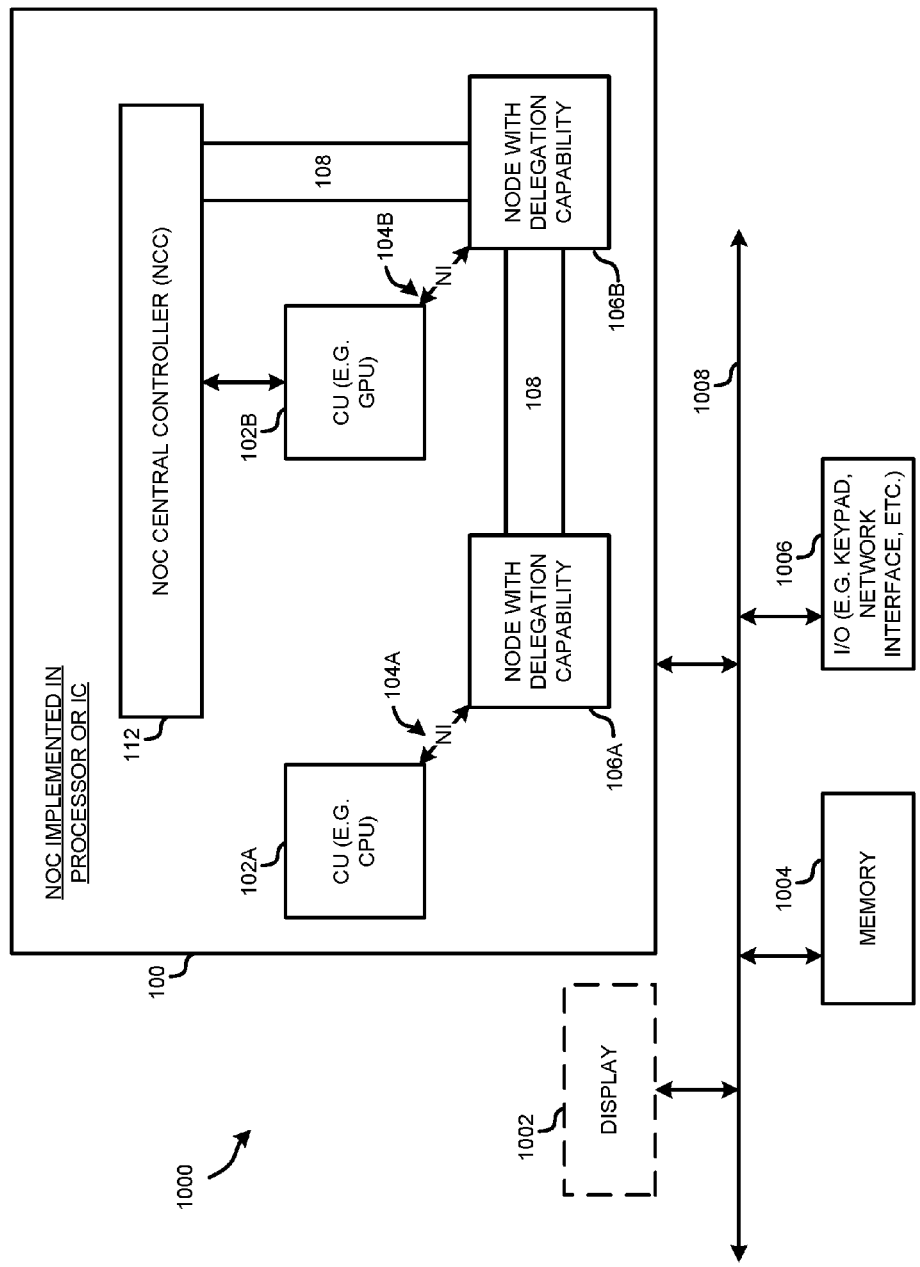
FIG. 10 is a block diagram illustrating an example of an apparatus having an integrated circuit having an NOC infrastructure employing a plurality of NOC nodes with delegation capability in accordance with one embodiment of the invention.

FIG. 10 is a block diagram illustrating an example of an apparatus having an integrated circuit having a network on chip (NOC) infrastructure employing a plurality of NOC nodes with delegation capability. The NOC architecture of FIG. 1 can be implemented in a processor or integrated circuit, such as a CPU, GPU, general processor (e.g., APU or GPGPU), or any suitable combination thereof or any other suitable processor. The NOC architecture implemented in the processor or integrated circuit may be within a computing environment 1000 that includes memory 1004, I/O interface 1006 (e.g. keypad, network interface, etc.), and optionally a display 1002. The computing environment 1000 may be a laptop computer, a desktop computer, a handheld device, HD television, a server, or any such suitable device. Communication paths, such as bus 1008, interconnecting the various components in FIG. 10 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

Although features and elements are described above in particular combinations, each feature or element can be used alone without the other features and elements or in various combinations with or without other features and elements. The apparatus described herein may be manufactured by using a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention cover any and all modifications, variations or equivalents that fall within the scope of the basic underlying principles disclosed above and claimed herein.

What is claimed is:

1. An integrated circuit comprising:
 a network on chip (NOC) comprising:
  a plurality of compute units (CUs) each comprising a processor having an instruction set and operable to delegate executable instructions intended for a respective CU processor; and
  a plurality of NOC nodes, interconnected to the plurality of CUs, operative to route data among the plurality of CUs, and each comprising a processor having the same instruction set as the processor in each of the plurality of CUs and operative to execute instructions that are delegated from at least one of the plurality of CUs, using the NOC node processor.

2. The integrated circuit of claim 1, further comprising an NOC controller (NCC), operatively coupled to the plurality of CUs and to the plurality of NOC nodes, and operative to identify at least one of the plurality of NOC nodes as an NOC node designated for delegation of execution of instructions from at least one of the plurality of CUs, wherein the designated NOC node is operative to execute the instructions.

3. The integrated circuit of claim 2, wherein the NCC is operative to issue an instruction delegation grant command to at least one of the CUs in response to an instruction delegation request, the instruction delegation grant command including node destination information that identifies the at least one of the plurality of NOC nodes as the NOC node designated for delegation of execution of instructions from at least one of the plurality of CUs;
 wherein the at least one of the CUs is operative to send an instruction delegation packet that comprises instructions delegated from the at least one of the CUs, to the designated NOC node; and
 wherein the designated NOC node is operative to execute the instructions in the sent instruction delegation packet.

4. The integrated circuit of claim 3, wherein the NCC further comprises:
 at least one request queue that receives the instruction delegation request from one of the CUs; and
 arbitration logic that retrieves the instruction delegation request from the at least one request queue to grant or deny the instruction delegation request based on at least one of the size of the at least one request queue and congestion reporting from the NOC nodes.

5. The integrated circuit of claim 3, wherein the processor of the at least one of the CUs identifies instructions suitable for delegation by identification data embedded in the instructions.

6. The integrated circuit of claim 3, further comprising:
 an instruction delegation unit that generates the instruction delegation packet to be sent to the designated NOC node based on the instruction delegation grant command,
 wherein the instruction delegation packet comprises a header that includes the node destination information that identifies the designated NOC node and a payload comprising delegated executable instructions.

7. The integrated circuit of claim 3, wherein the instruction delegation grant command includes node destination information that identifies at least one of the plurality of NOC nodes as an NOC node designated for delegation of execution of instructions from the at least one of the plurality of CUs based on a vicinity among the plurality of NOC nodes with respect to at least one memory segment.

8. An integrated circuit comprising:
 a network on chip (NOC) comprising:
  a plurality of heterogeneous compute units (CUs); and
  a plurality of heterogeneous NOC nodes, interconnected to the plurality of heterogeneous CUs, operative to route data among the plurality of heterogeneous CUs, and at least two of the plurality of heterogeneous NOC nodes having different types of function modules that perform delegatable functions delegated from at least one of the plurality of heterogeneous CUs.

9. The integrated circuit of claim 8, further comprising an NOC controller (NCC), operatively coupled to the plurality of heterogeneous CUs and to the plurality of heterogeneous NOC nodes, and operative to identify at least one of the plurality of heterogeneous NOC nodes as an NOC node designated for the type of function identified by the at least one of the plurality of heterogeneous CUs, wherein the designated NOC node is operative to perform the type of function.

10. The integrated circuit of claim 9, wherein the NCC is operative to issue a node-level function module selection command to at least one of the plurality of heterogeneous CUs in response to the node-level function request, the node-level function module selection command including node destination information that identifies the at least one of the plurality of heterogeneous NOC nodes as the NOC node designated for the type of function identified by the at least one of the plurality of heterogeneous CUs in the node-level function request,
 wherein at least one of the plurality of heterogeneous CUs is operative to issue a node-level function request indicating a type of function identified for use from at least one of the plurality of heterogeneous NOC nodes,
 wherein the at least one of the plurality of heterogeneous CUs is operative to send a function delegation packet specific to the identified type of function to the designated NOC node; and
 wherein the designated NOC node is operative to process the sent function delegation packet.

11. The integrated circuit of claim 10, wherein the NCC further comprises:
 at least one request queue that receives the node-level function request from one of the plurality of heterogeneous CUs; and
 arbitration logic that retrieves the node-level function request from the at least one request queue to grant or deny the node-level function request based on at least one of the size of the at least one request queue and congestion reporting from the plurality of heterogeneous NOC nodes.

12. The integrated circuit of claim 10, further comprising:
a function delegation unit that generates the function delegation packet to be sent to the designated NOC node based on the node-level function module selection command,
wherein the function delegation packet comprises a header that includes the node destination information that identifies the designated NOC node and a payload comprising data to be processed by the designated NOC node.

13. The integrated circuit of claim 10, wherein the node-level function module selection command includes node destination information that identifies at least one of the plurality of heterogeneous NOC nodes as an NOC node designated for the type of function identified by the at least one of the plurality of heterogeneous CUs based on a vicinity among the plurality of heterogeneous NOC nodes with respect to at least one memory segment.

14. A method in a network on chip (NOC), the method comprising:
routing data among a plurality of compute units (CUs) within the NOC; and
executing instructions, by a plurality of NOC nodes within the NOC, that are delegated from at least one of the plurality of CUs using a NOC node processor that has a same instruction set as processors in the plurality of compute units.

15. The method of claim 14, further comprising:
identifying at least one of a plurality of NOC nodes within the NOC as an NOC node designated for delegation of execution of instructions from at least one of the plurality of CUs, wherein the designated NOC node is operative to execute the instructions.

16. The method of claim 15, wherein the identifying further comprises:
issuing an instruction delegation grant command to at least one of the CUs in response to an instruction delegation request, the instruction delegation grant command including node destination information that identifies at least one of a plurality of NOC nodes within the NOC as an NOC node designated for delegation of execution of instructions from at least one of the plurality of CUs;
sending an instruction delegation packet that comprises instructions delegated from the at least one of the CUs, to the designated NOC node; and
executing the instructions in the sent instruction delegation packet.

17. The method of claim 16, further comprising:
receiving the instruction delegation request from one of the CUs; and
using the instruction delegation request to grant or deny the instruction delegation request based on at least one of a size of at least one request queue and congestion reporting from the NOC nodes.

18. The method of claim 16, further comprising:
identifying instructions suitable for delegation by identification data embedded in the instructions.

19. The method of claim 16, further comprising:
generating the instruction delegation packet to be sent to the designated NOC node based on the instruction delegation grant command, the instruction delegation packet comprising a header that includes the node destination information that identifies the designated NOC node and a payload comprising delegated executable instructions.

20. The method of claim 16, wherein the instruction delegation grant command includes node destination information that identifies at least one of the plurality of NOC nodes as an NOC node designated for delegation of execution of instructions from the at least one of the plurality of CUs based on a vicinity among the plurality of NOC nodes with respect to at least one memory segment.

* * * * *